Patented Jan. 14, 1941

2,228,270

UNITED STATES PATENT OFFICE 2,228,270

INTERPOLYMERIZATION PRODUCTS OF THE VINYL METHYL KETONE AND CROTONIC ACID

Heinrich Hopff, Ludwigshafen-on-the-Rhine, Werner Starck, Hofheim-in-Taunus, and Kurt Billig, Frankfort-on-the-Main-Hochst, Germany, assignors, by mesne assignments, to General Aniline & Film Corporation, New York, N. Y., a corporation of Delaware No Drawing. Application May 26, 1938, Serial No. 210,164. In Germany May 31, 1937

1 Claim. (Cl. 260—66)

The present invention relates to interpolymerization products.

In U. S. application Serial No. 203,608 filed April 22, 1938, in the name of Werner Starck and Kurt Billig a process of preparing interpolymerization products has been described which consists in subjecting vinyl esters and crotonic acid as well as the derivatives thereof to methods of polymerization.

Now we have found that crotonic acid and the derivatives thereof can form interpolymerization products with inorganic vinyl esters, first among which is vinyl chloride; furthermore that such interpolymerization may occur with other olefines capable of being polymerized, unsaturated carboxylic acids, for instance acrylic acid, methacrylic acid and the derivatives thereof, maleic acid or the derivatives thereof, vinyl ketones, aromatic vinyl compounds such as styrene, divinyls such as butadiene, 2-chlorobutadiene, furthermore isobutylene and others.

Crotonic acid and the derivatives thereof are not alone in showing this property; quite generally olefinic monocarboxylic acids which do not possess a vinyl group and can be polymerized alone only sparingly or not at all, have the property of forming interpolymerization products. New interpolymerization products may quite generally be obtained by polymerizing a mixture of an unsaturated organic compound capable of being polymerized with a compound of the group consisting of unsaturated carboxylic acids, the metal salts, esters, chlorides, amides and nitriles thereof, said acids and their derivatives being at most difficultly capable of being polymerized per se. Acids of this kind are for instance isocrotonic acid, methylcrotonic acid, angelic acid, tiglic acid and olefinic carboxylic acids with an aromatic radical, such as cinnamic acid; furthermore derivatives of the acids, for instance crotonic acid nitrile, crotonic acid ethyl ester, crotonic acid methyl ester, crotonic acid propyl ester, beta-chlorcrotonic acid, beta-chlorcrotonic acid nitrile, beta-chlorcrotonic acid methyl ester, beta-chlorcrotonic acid ethyl ester, beta-chlorcrotonic acid propyl ester, alpha-methylcrotonic acid, alpha-methylcrotonic acid nitrile, alpha-methylcrotonic acid methyl ester, alpha-methylcrotonic acid ethyl ester, alpha-methylcrotonic acid propyl ester, beta-methylcrotonic acid, beta-methylcrotonic acid nitrile, beta-methylcrotonic acid methyl ester, beta-methylcrotonic acid ethyl ester, beta-methylcrotonic acid propyl ester, as well as the chlorides and amides of all the acids named; furthermore the corresponding derivatives of the other above-named acids.

The interpolymerization must be performed with such quantitative proportions that the component which cannot alone be polymerized, such as the crotonic acid, is present during the polymerization process at most in an equivalent proportion to the component which can alone be polymerized, for instance the vinyl chloride, that is to say there must be used per one mol of the component which does not polymerize alone at least one mol or more of the component which does polymerize alone. It has been found that the interpolymerization occurs only if the inactive component is accompanied by an excess of the component which readily polymerizes. In general the optimum conditions, namely those under which products with the distinctive properties of interpolymerization products are produced, exist when about 2 to 3 mol of the readily polymerizable component are used per 1 mol of a slowly polymerizing component. The proportions also depend, of course to a large extent on the kind of the individual components so that no fixed rule can be given with regard to the quantitative proportions for the large sphere of the interpolymerizates. The said optimum proportion varies, however, within certain not very wide limits so that particularly when the proportion of the two components approaches the equimolecular proportion the final products tend to lose their favorable properties. This is especially the case when the co-polymerization of the slowly polymerizing component does not occur completely smoothly. The component which no longer takes part in the polymerization may have an unfavorable action on the polymerization process. On the other hand, the danger exists that if the proportion of the slowly polymerizing component is too small, the single polymerizate of the readily polymerized component is produced simultaneously with an interpolymerization product. This danger is in general not very great and may easily be diminished by applying the most suitable conditions for the polymerization.

The vinyl ketones and particularly the vinyl-methyl ketone are especially suitable for the interpolymerization with the unsaturated acids and the derivatives thereof which alone are not polymerized.

The polymerization conditions by which the products are obtained are the usual ones, i. e. the components are mixed and the mixture is polymerized either in the form of a block or in a solvent or diluent, particularly in an emulsion, for instance in the presence of known catalysts such as hydrogen peroxide, care being taken that the quantity of heat required is added.

The process affords a series of new polymerization products which are important for industrial purposes. With the aid of this process it is possible to modify many important polymeric compounds, such as polyvinyl chloride, polystyrene, polyvinyl ester such as vinyl formate, vinyl acetate, vinyl propionate, vinyl butyrate, vinyl chloracetate, vinyl butoxyacetate, vinyl stearate, in the sense that they acquire the properties hitherto produced only by addition of so-called softening agents. The presence of such foreign constituents is often not desirable and it has been endeavored to construct the polymeric molecule in a manner which would produce the desired properties without added matter.

The following examples serve to illustrate the invention, but they are not intended to limit it thereto; the parts are by weight:

(1) A mixture of 70 parts of vinyl-methyl ketone, 44 parts of crotonic acid, 100 parts of water, 2 parts of potassium persulfate and 1 part of aqueous hydrogen peroxide of 30 per cent strength is heated for 3 to 15 hours at 70° C. to 80° C. The solid polymerization product obtained can readily be separated from the water covering the product and the latter is purified by boiling it with water. It is soluble in acetone, glacial acetic acid and glycol-formal.

On heating it with a solution of sodium carbonate of 10 per cent strength the sodium salt of the interpolymerization product from vinyl-methyl ketone and crotonic acid is formed as a viscous resin which is soluble in any proportion in water. The resin is salted out by means of salt solutions. When it is treated with acids, such as acetic acid or hydrochloric acid, the free resin acid is precipitated in the form of white flakes.

(2) A mixture of 70 parts of freshly distilled vinyl-methyl ketone, 37 parts of cinnamic acid, 1 part of hydrogen peroxide of 30 per cent strength, 0.25 part of diacetyl and 2 parts of acetaldehyde is kept for 10 to 20 hours at 70° C. to 80° C. A feebly brownish, hard block is formed. The interpolymerization product dissolves in acetone, methylene chloride, aqueous alcohol of 60 to 90 per cent strength, glycol-formal or glacial acetic acid, but not in benzene or benzine. When it is boiled in an aqueous sodium carbonate solution which contains the equivalent of sodium carbonate or a small excess, there is produced a solution of the sodium salt of the interpolymerization product which can be diluted in any proportion with water. It has a strong foaming action; when treated with acid it precipitates the free resin acid.

The reaction is not limited to the proportion of vinyl ketone and cinnamic acid given above.

(3) A mixture of 70 parts of vinyl-methyl ketone, 16 parts of cinnamic acid, 180 parts of an aqueous solution of 2 per cent strength of the sodium salt of polyacrylic acid as an emulsifying agent, 1.5 parts of potassium persulfate and 1 part of aqueous hydrogen peroxide of 30 per cent strength is heated for 2 to 4 hours to 70° C. to 80° C. while rapidly stirring. A white suspension or emulsion is obtained which may be freed from small portions of the monomeric vinyl-methyl ketone by blowing steam through it.

The emulsion is soluble in dilute sodium carbonat solution, dilute caustic soda solution and in aqueous ammonia.

In this case too, the proportion of vinyl-methyl ketone to cinnamic acid is not limited to that named above.

(4) A mixture of 80 parts of methacrylic acid methyl ester and 20 parts of crotonic acid methyl ester to which 2 parts of benzoyl peroxide have been added is heated for 20 hours to 80° C. and further 20 hours to 100° C. A colorless limpid resin of a great surface hardness is obtained.

(5) A mixture of 212.5 parts of beta-chlorobutadiene and 37.5 parts of crotonic acid nitrile is emulsified, while rapidly stirring, in 750 parts of a solution of 3 per cent strength of sodium polyacrylate to which 3 parts of potassium persulfate have been added. The emulsion obtained is then heated to 40° C. to 45° C. A lively polymerization sets in. A stable latex is obtained which is either directly used to obtain finished products or is precipitated for instance with the aid of sodium chloride. The coagulate may be dried, if desired, on the roller. It constitutes a viscous mass resembling rubber.

(6) In an enamelled vessel resistant to pressure 160 parts of vinyl chloride and 30 parts of crotonic acid methyl ester are emulsified in a solution of 9 parts of sodium alpha-hydroxyoctodecanesulfonate and 3 parts of potassium persulfate in 550 parts of water, while stirring; the emulsion is then heated to 40° C. to 45° C. until the polymerization is complete (60 hours).

The aqueous dispersion obtained is precipitated by the addition of a solution of aluminium sulfate, well washed with distilled water and then with sodium carbonate solution and dried. A snow white powder is obtained which is very suitable for the manufacture of Celluloid-like articles, for instance transparent plates, for combs, shafts of tooth brushes and the like.

(7) 400 parts of butadiene and 150 parts of crotonic acid ethyl ester are stirred for 3 days at 60° C. in 3000 parts of a solution of 2 per cent strength of sodium alpha-hydroxyoctadecanesulfonate containing 10 parts of potassium persulfate, 15 parts of aqueous hydrogen peroxide of 30 per cent strength and 15 parts of benzoyl peroxide and being adjusted to a pH-value of 5.2 by the addition of formic acid. On precipitating with aluminium sulfate 250 parts of an elastic viscous mass are obtained which may for instance be used for the manufacture of insulating material for cables.

In a similar manner a white powder capable of being molded is obtained from 80 parts of acrylic nitrile and 20 parts of crotonic acid methyl ester.

From 80 parts of styrene and 20 parts of crotonic acid methyl ester a white powder is obtained according to the same prescription which powder, when heated, has a good flowing power.

From 67 parts of styrene, 21 parts of acrylic acid nitrile and 12 parts of crotonic acid ethyl ester there is likewise obtained a white powder which may readily be molded.

From 80 parts of acrylic acid methyl ester and 20 parts of crotonic acid ester there is obtained a soft, rubber-like interpolymerizate which is suitable for the manufacture of cable material.

(8) 120 parts of butadiene are mixed with 35 parts of crotonic acid nitrile in 1000 parts of an aqueous solution of 2.5 per cent strength of sodium alpha-hydroxyoctodecanesulfonate. 4 parts of potassium persulfate and 5 parts of hydrogen peroxide are added and such a quantity of formic acid as yields a pH-value of 5.3. The mixture is then stirred for 4 days at 55° C. to 60° C. The emulsion is precipitated by means of aluminium sulfate whereby the polymerizate is obtained in the form of a viscous elastic mass. After having been washed and dried it forms a rubber-like mass which is distinguished by its resistance to solvents, especially fuels.

We claim:

The resinous interpolymerization products obtained by polymerizing a mixture of 70 parts of vinyl-methyl ketone and 44 parts of crotonic acid in the presence of water, potassium persulfate and hydrogen peroxide.

HEINRICH HOPFF.
WERNER STARCK.
KURT BILLIG.